May 2, 1933. J. H. SHERTS 1,906,821
APPARATUS FOR MAKING COMPOSITE GLASS
Filed Oct. 30, 1929  5 Sheets-Sheet 1
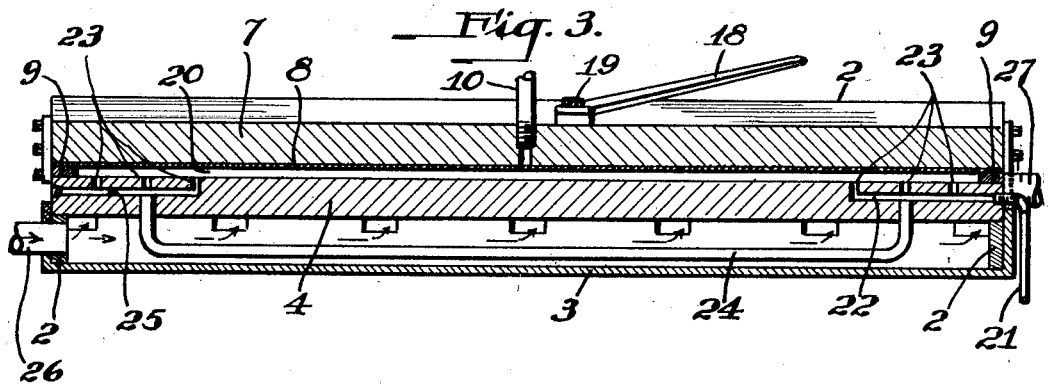
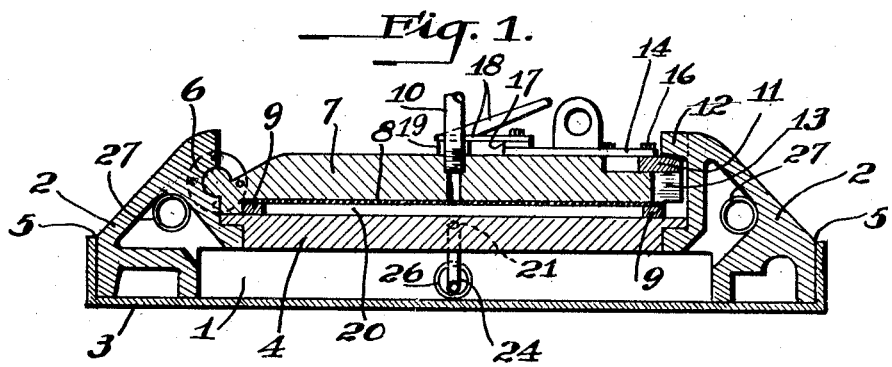
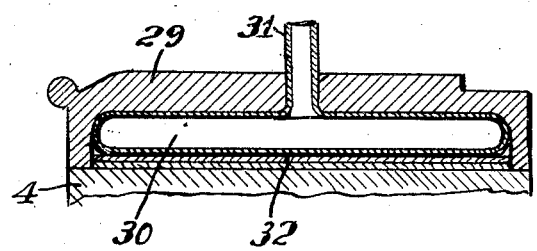
INVENTOR
James H. Sherts
by
James E. Bradley
Atty May 2, 1933. J. H. SHERTS 1,906,821
APPARATUS FOR MAKING COMPOSITE GLASS
Filed Oct. 30, 1929 5 Sheets-Sheet 2
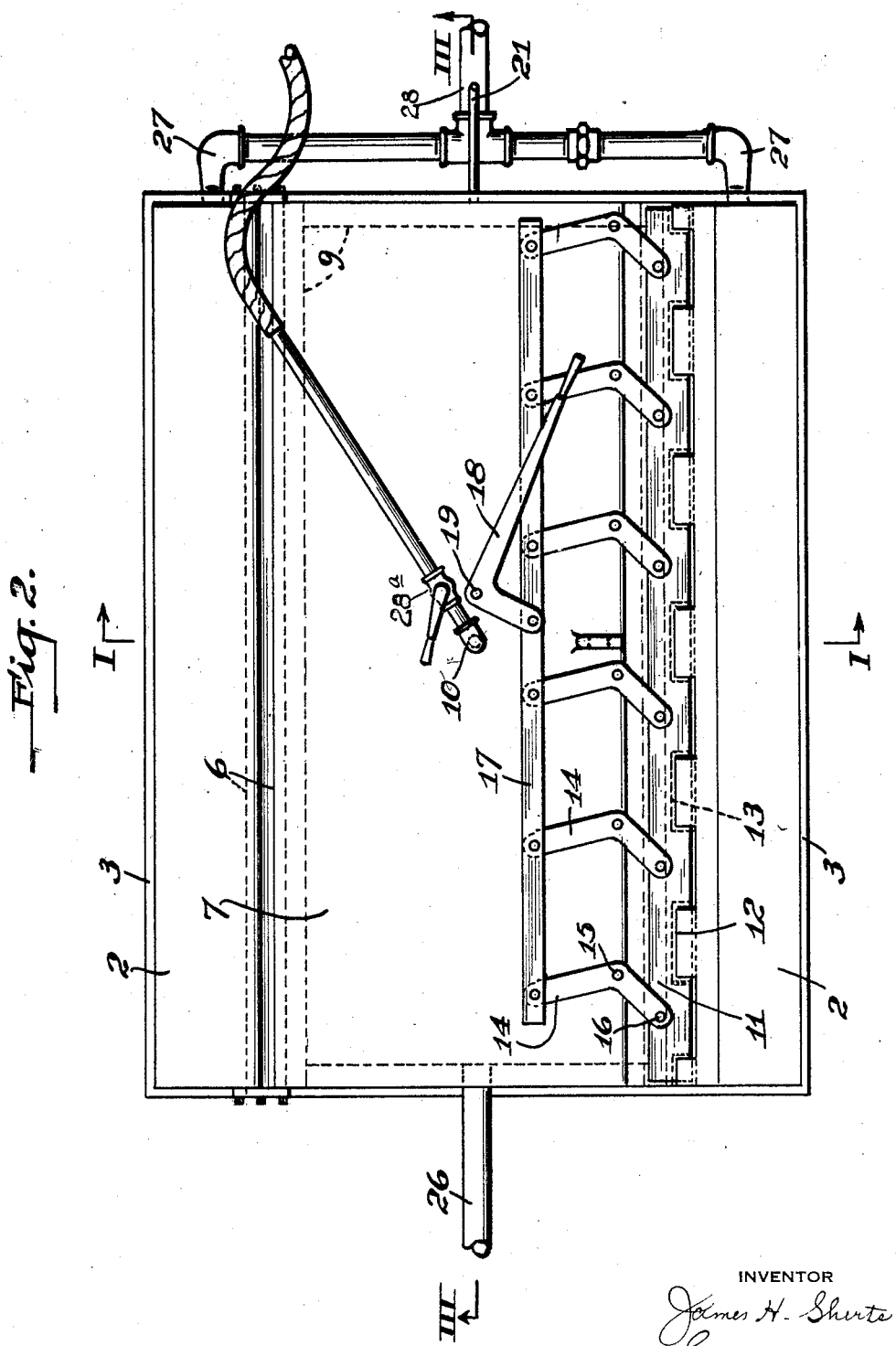

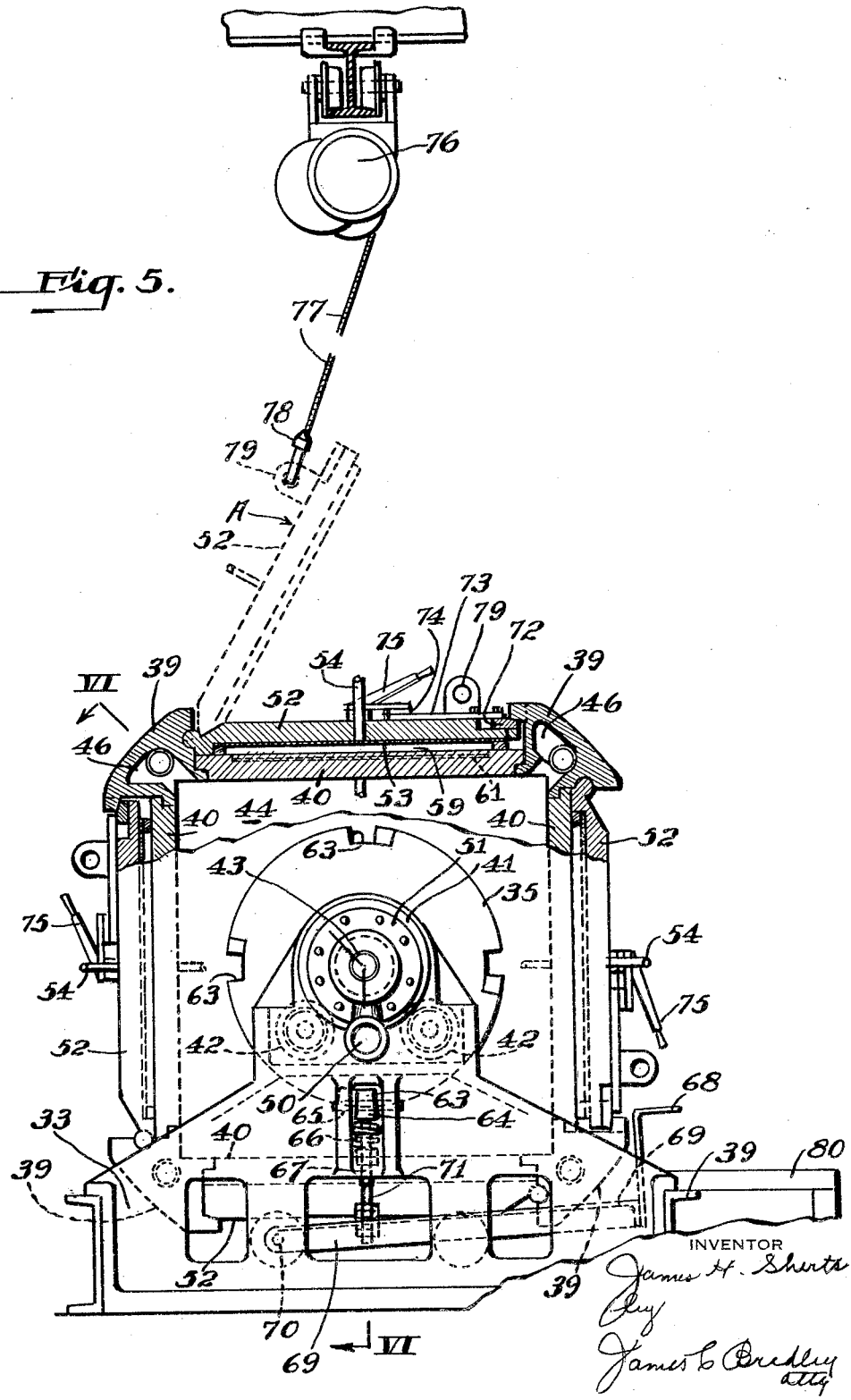

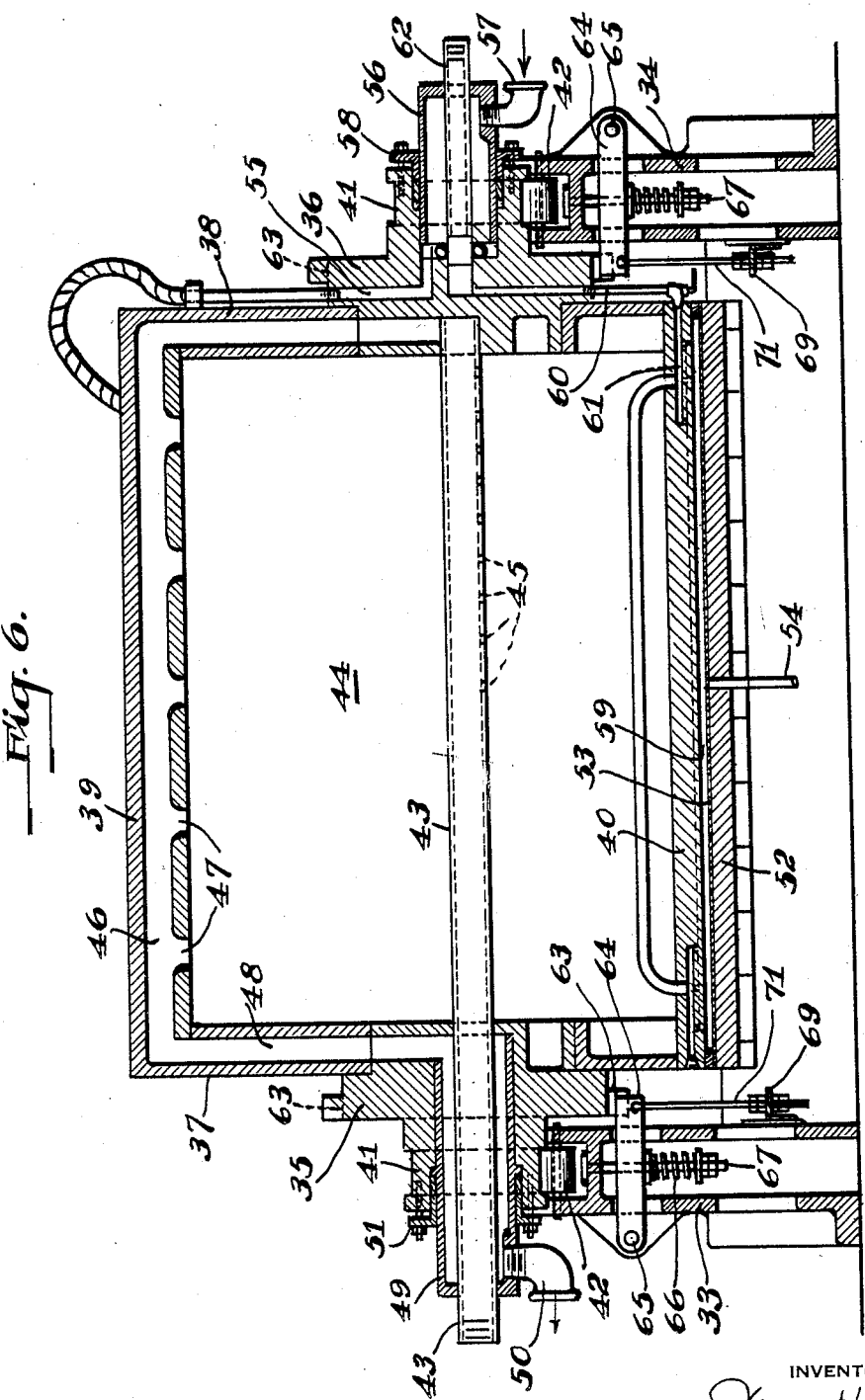

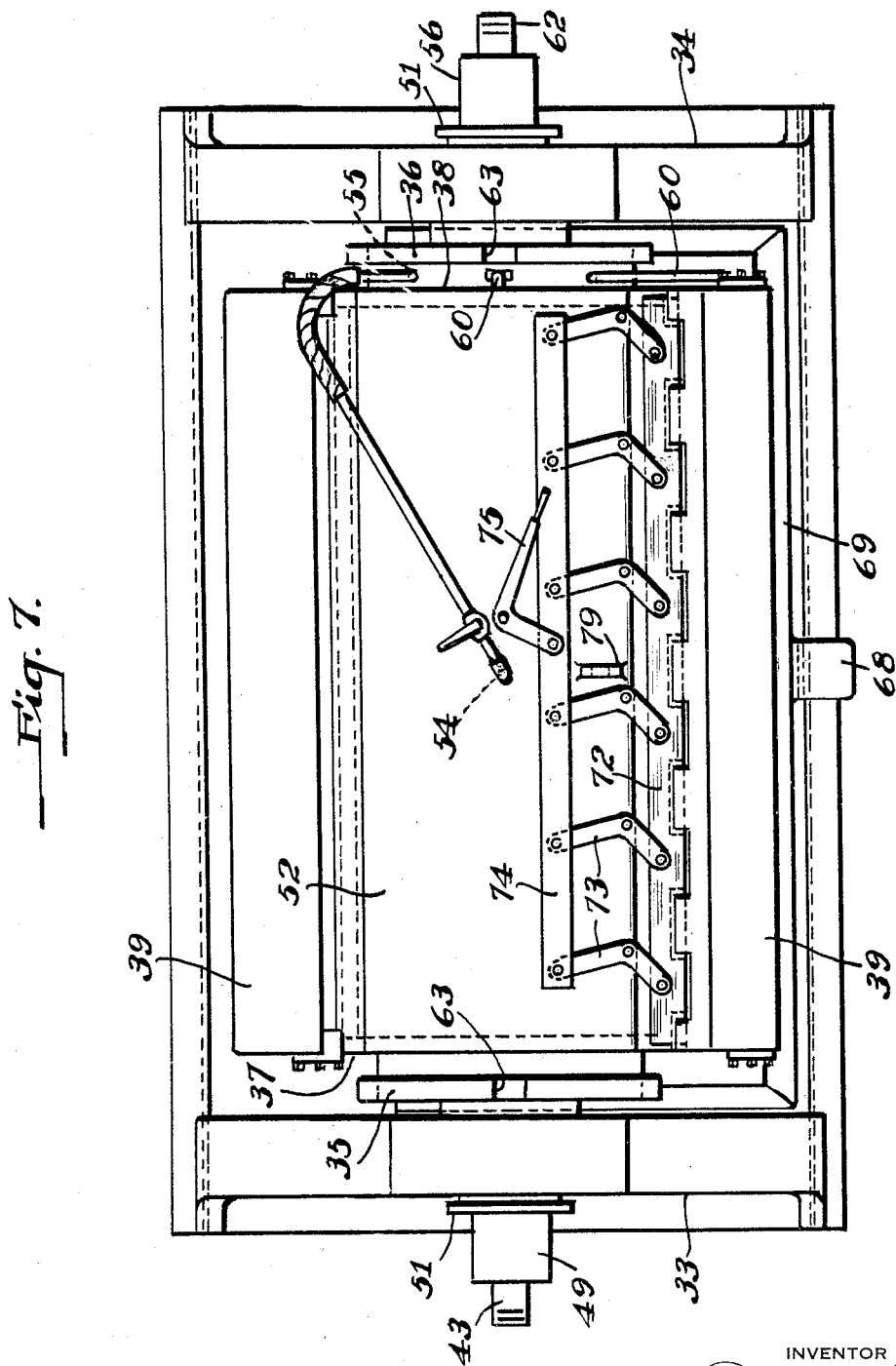

Patented May 2, 1933

1,906,821

UNITED STATES PATENT OFFICE

JAMES H. SHERTS, OF BRACKENRIDGE, PENNSYLVANIA, ASSIGNOR TO DUPLATE CORPORATION, A CORPORATION OF DELAWARE

APPARATUS FOR MAKING COMPOSITE GLASS

Application filed October 30, 1929. Serial No. 403,510.

The invention relates to apparatus for making composite glass and particularly to the means for applying heat and pressure to cause the joinder between the glass sheets and reinforcing material which is used between the glass sheets, such material being ordinarily pyroxylin plastic, such as celluloid. The usual procedure is to coat the faces of the glass sheets with gelatin, or other cement, which is allowed to dry, after which the sheet of plastic is placed between the glass sheets and heat and pressure are applied to the sandwich. Heretofore, the pressing has been accomplished by placing the sandwich between the steam heated platens of a power press, or by putting the sandwich in a rubber bag or container and placing it in a pressure tank. It has also been proposed to place the sandwich between a pair of flexible platens and apply heated liquid under pressure behind the platens. The object of the present invention is to provide an improved and simplified apparatus which can be operated rapidly and economically and with a minimum amount of breakage. Briefly stated, the apparatus in its simplest form comprises a rigid metal platen on which the sandwich is supported and a rubber diaphragm carried by a movable cover which fits over the metal platen. The sandwich is heated entirely from the metal platen, while pressure is provided by supplying air under pressure behind the diaphragm. The diaphragm with the air under pressure behind it acts as an insulator for the upper side of the sandwich so that no difficulty is experienced in heating the sandwich uniformly and quickly despite the fact that the heat is applied only from the one side of the sandwich. To heat only from one side instead of from both sides, as has always been done heretofore, and to apply pressure from only one side instead of from both sides greatly simplifies the apparatus besides making it easier to handle and permitting a shorter cycle of operations. Certain embodiments of the invention are shown in the accompanying drawings, wherein:

Figure 1 is a section through the apparatus on the line I—I of Fig. 2. Fig. 2 is a plan view. Fig. 3 is a section on the line III—III of Fig. 2. Fig. 4 is a detail section through a modification. Fig. 5 is a partial end elevation and partial section of a modified construction. Fig. 6 is a section on the line VI—VI of Fig. 5. And Fig. 7 is a plan view of the construction in Figs. 5 and 6.

Referring to Figs. 1, 2 and 3, 1 is a heating chamber whose walls are made up of the castings 2, 2, the plate 3 and the platen 4 which is adapted to support the set of sheets which are to be composited. The plate 3 has its edges turned up in order to receive the castings 2, 2 and the joints at 5 are made tight by babbitting and calking. The platen 4 is preferably welded to its seat in the castings 2, 2 and the plate 3. Mounted for swinging movement about the hinge 6 is the cover 7, such cover being shown as locked in closed position in the drawings. This cover carries on its lower side a rubber diaphragm or sheet 8 held securely at its edges to the cover by means of the strips 9 held in place by screws. Air pressure is supplied to the space between the cover 7 and diaphragm 8 in order to give the necessary pressing action upon the set of sheets by means of the air connection 10.

The cover is locked in closed position by means of the bar 11 slidably mounted upon the edge of the cover, lying when in locked position, in the position shown in Fig. 1. To unlock the cover the bar 11 is moved to the left. One of the castings 2, 2 is provided with an overhanging flange 12 which is notched, as indicated in Fig. 2, and the edge 13 of the cover is correspondingly notched so that when the bar 11 is moved to the left (Fig. 1), the cover 7 can be swung upwards around its hinge 6 since the recesses in the flange 12 come opposite the lugs in the edge 13 of the cover, as will be readily seen by reference to Fig. 2. The bar 11 is swung back by the series of bell crank levers 14, each fulcrumed at 15 on the cover and having their short arms pivoted to the bar at 16. The long arms of the levers are pivoted to the bar 17 and this bar is moved back and forth by means of the hand lever 18 pivoted to the cover at 19.

Before applying air pressure above the diaphragm 8, it is desirable to exhaust the air from the space 20 (Fig. 3) between the cover and the platen 4 in which the set of plates to be joined together are placed. This is accomplished by means of a vacuum pipe 21 connected to suitable exhausting apparatus. The pipe 21 is connected to a passage 22 which communicates with a series of grooves 23 in the face of the platen 4. A pipe connection 24 is provided from the passage 22 to a similar passage 25 at the other side of the platen. This vacuum arrangement performs the function of withdrawing a large part of the air from between the opposing faces of the sheets to be composited preliminary to such compositing action.

The heating chamber 1 is connected at one side to an inlet pipe 26 and at the other side to a pair of outlet pipes 27 leading to the common outlet pipe 28. Provision is made by means of these connections and a suitable circulating pump for causing a flow of hot liquid through the chamber to heat the platen 4 which in turn heats the set of sheets to be composited so that the cement is softened and also the pyroxylin plastic. Any suitable heating medium may be used either a liquid as heretofore referred to or steam.

In operation the set of sheets to be composited with their opposing faces provided with a suitable cement is placed on the platen 4, the cover is closed, position shown in the drawings, and the locking bar 11 moved to locking position. Heated liquid is now circulated through the chamber 1 until the platen 4 and the composite plates are heated to a temperature preferably somewhat above 200 degrees F., which causes the softening of the cement and pyroxylin plastic. At the same time or before the heating operation, the air is exhausted from the space 20 surrounding the sheets by means of the vacuum connection 21. After the exhausting and heating operations, the valve 28ª in the air supply pipe 10 is opened, thus admitting pressure behind the diaphragm 8, causing it to exert pressure uniformly over the area of the sheets to be composited lying thereunderneath. The pressure thus applied may run anywhere from 50 to 150 pounds depending upon conditions. In some cases the pressing in this apparatus may be an operation preliminary to a second pressing operation in which case the pressure will be relatively low. On the other hand, if the pressing operation is the only one to which the plates are to be exposed, the pressure employed is relatively high. After the air has been applied for a short time, the valve 28 is turned so as to cut off the pressure to the space behind the diaphragm and open such space to the atmosphere. The bar 11 is then moved to the rear by means of the hand lever 18 and the lid swung up to an angle of about 45 degrees either by hand or by means of a hoist, thus exposing the composited plate lying therebeneath which may then be removed and taken to storage. A new set of sheets may now be placed upon the platen 4 and the cycle of operations repeated.

Fig. 4 illustrates a modification in which the lid 29 is provided with a recess carrying a rubber bag or container 30 to which air is supplied under pressure through the pipe 31. This rubber container takes the place of the diaphragm construction of Fig. 1, the sheet 32 constituting the lower side of the container corresponding in function to the sheet or diaphragm 8. Aside from this detail of construction the apparatus is the same throughout as that of Figs. 1 to 3 and the method of operating the apparatus is the same as above described.

Figs. 5, 6 and 7 illustrate a modification involving the use of the apparatus of Figs. 1, 2 and 3 in multiple by mounting such apparatus so that it constitutes the sides of a hollow drum. Four sets of apparatus are in this way mounted for rotation in front of the operator and the interior of the drum constitutes the heating chamber through which the liquid for heating the various platens is circulated. Provision is made for circulating the heating liquid or fluid to and from the drum through the hollow axis of rotation of the drum and the vacuum connection for exhausting the air from the cavities which carry the sets of plates also extends through one of the hollow axes of rotation of the drum.

Referring to the drawings, 33 and 34 are the standards in which the drum is mounted for rotation. The drum comprises a pair of end castings 35 and 36 to which the end plates 37 and 38 are bolted, the four corner pieces 39, 39, 39, 39 and the platens 40, 40, 40, 40. The end castings 35 have bearing portions 41 each supported by a pair of rollers 42 carried by the standards 33 and 34. A pipe 43 extends longitudinally through the drum and serves as an inlet for the heating liquid which is supplied to the chamber 44. This pipe is perforated, as indicated at 45, at its inner end and the liquid after flowing through the drum passes into the passages 46 in the corner pieces via the openings 47. It then returns through the passage 48 to the sleeve 49 which surrounds the pipe 43 and flows out through the pipe 50 which is connected to the outer end of such sleeve, the sleeve being suitably packed by means of the gland 51.

Lying above each of the platens 40 is a cover 52 similar in all respects in its construction and mounting to the cover 8 described in connection with Figs. 1 to 3, such cover being hinged so that when open it occupies the position shown in dotted lines at A in Fig. 5. These covers are provided with diaphragms 53 on their lower sides, air being supplied behind the diaphragms through the pipes 54. These pipes lead to passages 55 (Fig. 6) through the end casting 36, such passages communicating at their inner ends with the sleeve 56 and air is supplied to such sleeve through the pipe 57. The sleeve is provided with a suitable packing gland 58. The spaces 59 between the platens and diaphragms are exhausted through the vacuum pipes 60 (Fig. 6) and passages 61, which latter are connected with grooves on the faces of the platens as in the Figs. 1 to 3 construction. The pipes 60 communicate with the inner end of a pipe 62 which is connected to a suitable exhausting apparatus.

In order to index the drum at each quarter revolution, the end castings 35 and 36 are provided with four notches 63 adapted to be engaged by the levers 64 which are pivoted at their outer ends at 65 (Fig. 6.) These levers are pressed upward by means of springs 66 mounted on bolts 67. The levers are adapted to be moved downward from the foot pedal 68 extending along the front of the machine and connected to the frame 69, such frame being in the form of a channel pivoted at 70 (Fig. 5) and connected to the levers 64 by means of the rods 71.

Each of the covers is locked in position by means of a bar 72, such bar being operated by means of a series of bell crank levers 73, a bar 74 and an operating lever 75 shown in Fig. 7 and similar to the locking construction already described in connection with Figs. 1 to 3. The drum may be rotated by hand and the various covers also lifted by hand, but preferably a hoist 76 is employed for this purpose, such hoist having a cable 77 with a hook 78 at its lower end. To rotate the drum the hook 78 is engaged with one of the eyes 79 (Fig. 5) and after the indexing device is released the hoist is operated to rotate the drum until the cover to be lifted lies in a horizontal position. Upon releasing the bar 72, a further operation of the hoist opens the cover to the position A shown in Fig. 5.

In operation, the drum is rotated step by step at suitable timed intervals and each cover is raised when it arrives at horizontal position and the platen beneath the cover is loaded with a set of plates to be composited. The cover is then closed and locked in position and the drum moved ahead 90 degrees bringing the next platen in position for loading. During the rotation of the drum, the platens are heated by the circulation of hot liquid into the drum through the pipe 43 and then out through the sleeve 49 and after each set of sheets is sufficiently heated, air under pressure is applied above the diaphragms 53 from the pipes 54 to provide the necessary pressure. Just prior to such application of pressure, air is exhausted from the spaces beneath the platens through the connections 60, 61 and 62. By the time any set of sheets has made the circuit of 360 degrees incident to the rotation of the drum, the operations of heating the plates and pressing them has been completed, so that all that remains is to open the cover when it arrives at top position, remove the set of plates, and substitute another set of plates. The operation is thus a continuous one, the drum being constantly loaded and unloaded. The operator preferably stands upon a platform 80 at the side of the machine and performs the operations of turning the drum, opening the covers and unloading and loading the various platens, the sets of plates ready for loading being brought to a convenient position when assembled by means of the trucks and the composited plates being placed by him upon racks also adjacent the drum which are moved away by other operators when filled.

What I claim is:

1. Apparatus for making composite glass comprising a rigid supporting platen of metal for the sheets to be composited, a movable cover fitting over the platen mounted so that it may be swung aside to expose the platen and provided on its inner side with a flexible sheet, means for locking the cover in position over the platen, means for supplying fluid under pressure behind the flexible sheet, and means for heating the platen.

2. Apparatus for making composite glass comprising a rigid supporting platen of metal for the sheets to be composited, a movable cover fitting over the platen mounted so that it may be swung aside to expose the platen and provided on its inner side with a rubber sheet, means for locking the cover in position over the platen, means for supplying air under pressure behind the rubber sheet, and means for heating the platen.

3. Apparatus for making composite glass comprising a rigid supporting platen of metal for the sheets to be composited, a movable cover fitting over the platen mounted so that it may be swung aside to expose the platen and provided on its inner side with a rubber sheet, means for locking the cover in position over the platen, means for exhausting the air from the space occupied by said sheets which are to be composited lying between the platen and the rubber sheet, means for supplying air under pressure behind the rubber sheet, and means for heating the platen.

4. Apparatus for making composite glass comprising a casing provided with a rigid supporting platen of metal for the sheets to be composited and a heating chamber of which the platen constitutes one wall, a movable cover fitting over the platen mounted so that it may be swung aside so as to expose the platen and provided on its inner side with a flexible sheet, means for locking the cover in position over the platen, means for exhausting the air from the space occupied by said sheets which are to be composited lying between the platen and the rubber sheet, means for supplying air under pressure behind the flexible sheet, and means for circulating a heating fluid through said chamber.

5. Apparatus for making composite glass comprising a hollow drum mounted for rotation about a hollow axis, a series of flat rigid platens of metal constituting the walls of the drum and each adapted to act as a support for the sheets to be composited, means for circulating a heating fluid through the drum to heat the platens, a movable cover for each platen having on its inner side a flexible sheet, means for locking the covers in position over the platens, and means for supplying fluid under pressure behind the flexible sheets.

6. Apparatus for making composite glass comprising a hollow drum mounted for rotation about a hollow axis, a series of flat rigid platens of metal constituting the walls of the drum and each adapted to act as a support for the sheets to be composited, means for circulating a heating fluid through the drum to heat the platens, a movable cover for each platen having on its inner side a rubber sheet, means for locking the covers in position over the platens, and means for supplying air under pressure behind the rubber sheets.

7. Apparatus for making composite glass comprising a hollow drum mounted for rotation about a hollow axis, a series of flat rigid platens of metal constituting the walls of the drum and each adapted to act as a support for the sheets to be composited, means for circulating a heating fluid through the drum to heat the platens, a movable cover for each platen having on its inner side a rubber sheet, means for locking the covers in position over the platens, means for exhausting the air from the spaces between the platens and the rubber sheets, and means for supplying air under pressure behind the rubber sheets.

8. Apparatus for making composite glass comprising a rigid supporting platen of metal for the sheets to be composited having its surface grooved, a movable cover fitting over the platen hinged thereto at one edge and provided on its inner side with a flexible sheet, means for locking the cover in position over the platen, means communicating with the grooves in the surface of the platen for exhausting the air from the space occupied by said sheets which are to be composited lying between the platen and the flexible sheet, means for applying fluid under pressure behind the sheet, and means for heating the platen.

9. Apparatus for making composite glass comprising a rigid supporting platen of metal for the sheets to be composited, having therein a heating cavity, a cover hinged adjacent one edge of the platen and provided on its inner side with a flexible sheet, means for locking the cover to the platen at the edge thereof which is opposite to its hinged edge, means for exhausting the air from the space occupied by said sheets which are to be composited lying between the surface of the platen and the flexible sheet, and means for supplying a heating fluid to the cavity in the platen.

In testimony whereof, I have hereunto subscribed my name this twenty fourth day of October 1929.

JAMES H. SHERTS.